Figure 1:
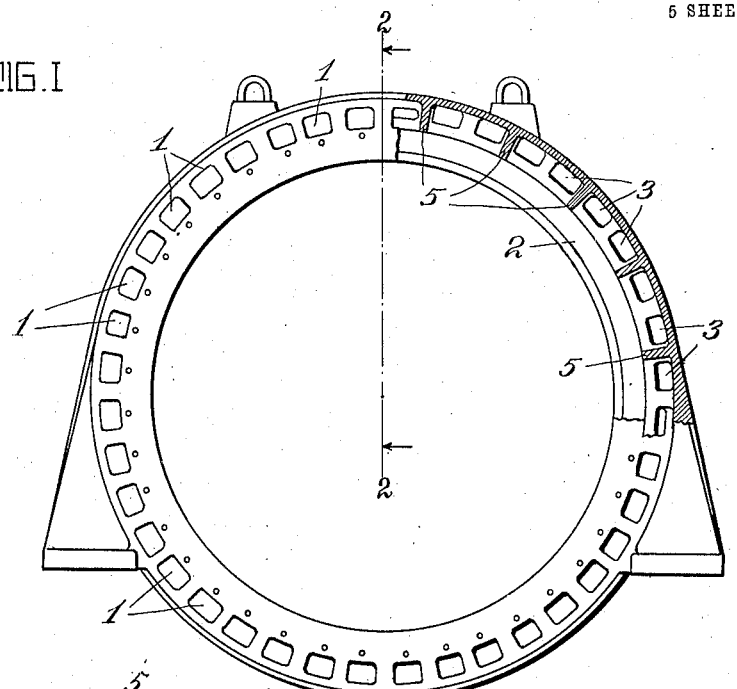

J. BURKE.
DYNAMO ELECTRIC MACHINE.
APPLICATION FILED SEPT. 23, 1907.

1,033,379.

Patented July 23, 1912.
5 SHEETS—SHEET 1.

Witnesses
Edmund Duboq
Geo. N. Kerr

James Burke Inventor
By his Attorneys
Edwards, Sager & Wooster

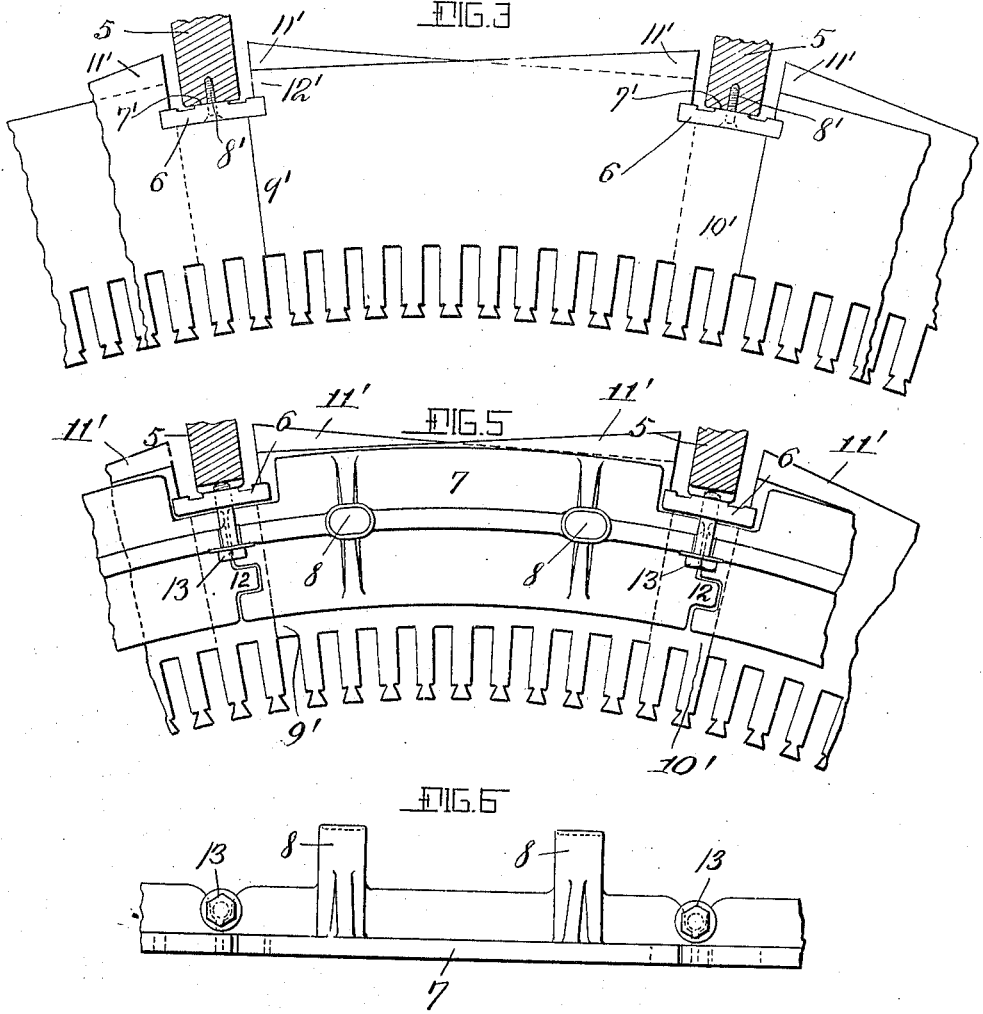

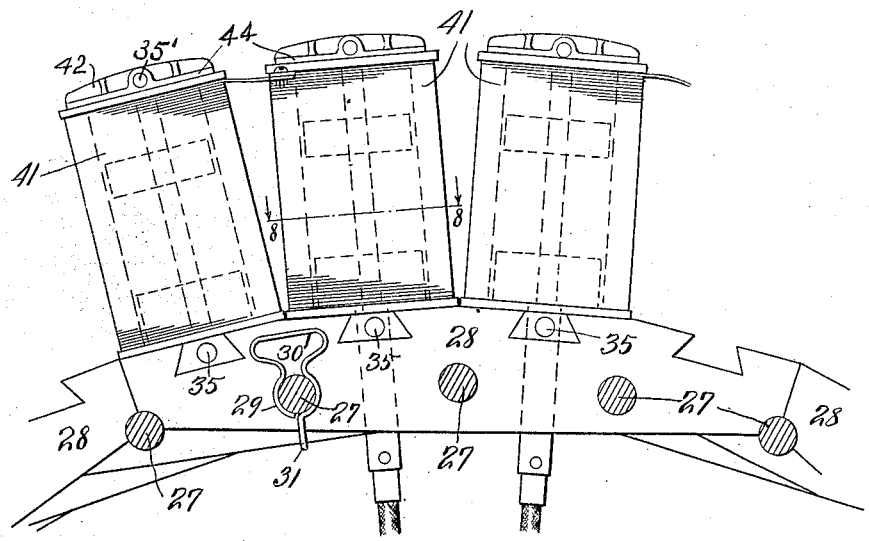
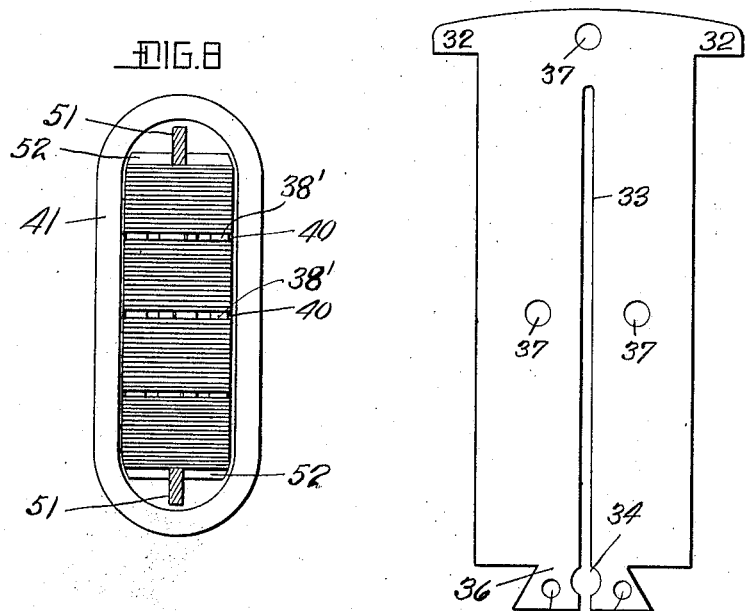

J. BURKE.
DYNAMO ELECTRIC MACHINE.
APPLICATION FILED SEPT. 23, 1907.
1,033,379.
Patented July 23, 1912.
5 SHEETS—SHEET 4.
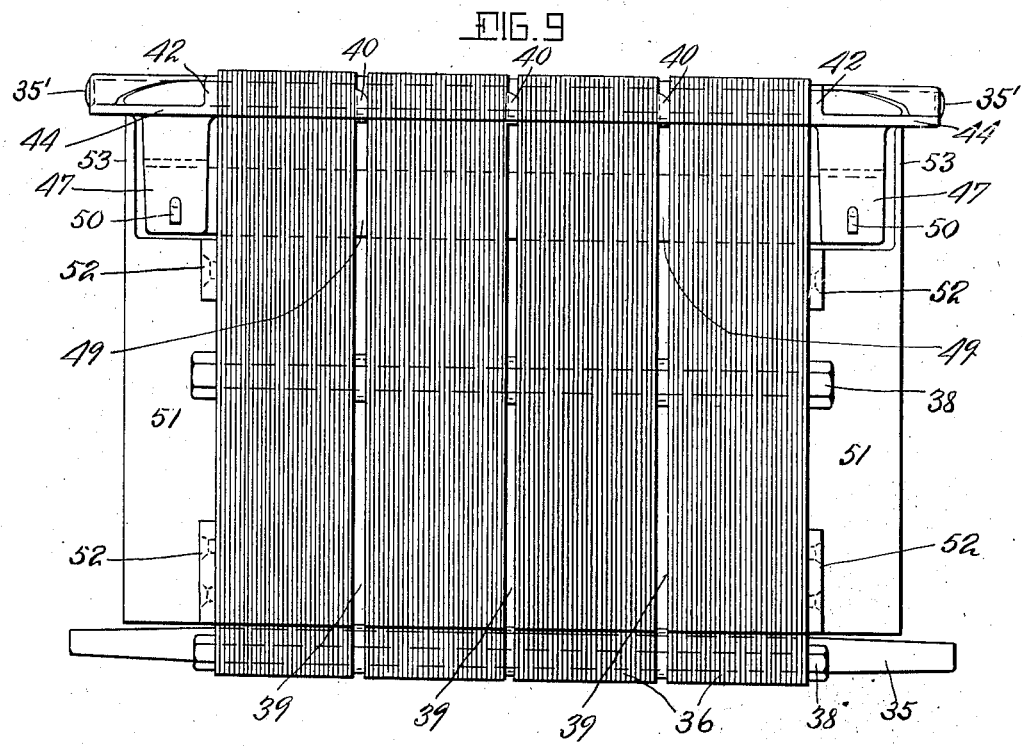
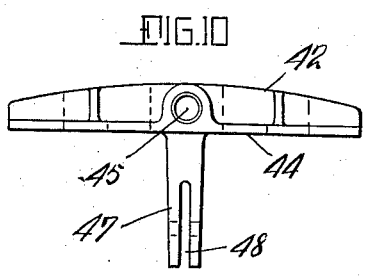
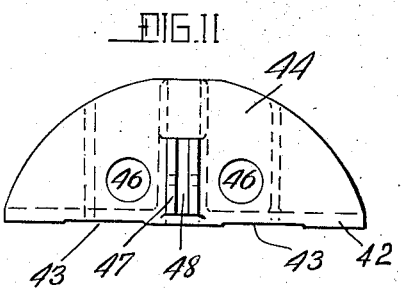

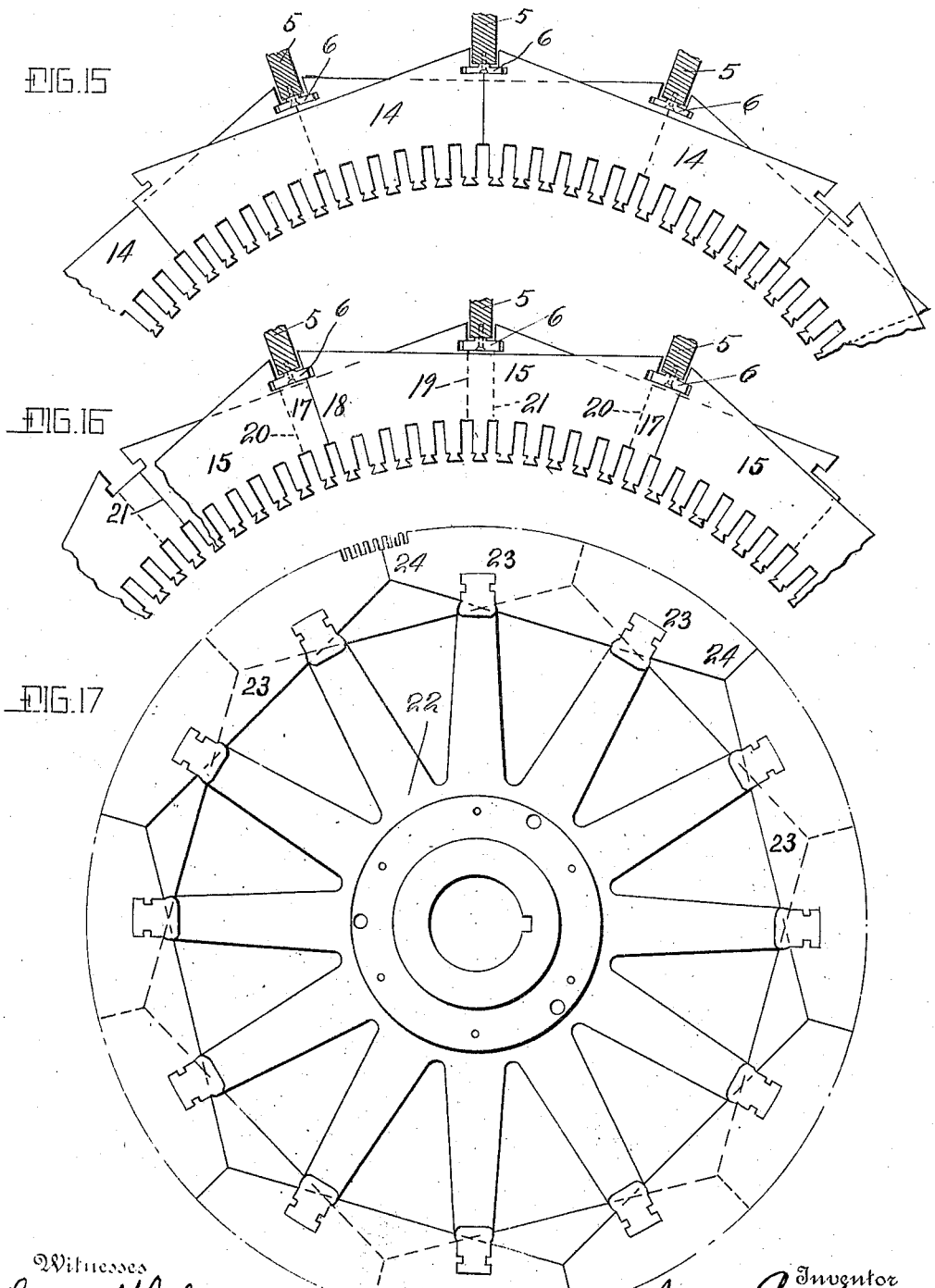

UNITED STATES PATENT OFFICE.

JAMES BURKE, OF ERIE, PENNSYLVANIA, ASSIGNOR TO BURKE ELECTRIC COMPANY, A CORPORATION OF PENNSYLVANIA.

DYNAMO-ELECTRIC MACHINE.

1,033,379.

Specification of Letters Patent. Patented July 23, 1912.

Application filed September 23, 1907. Serial No. 394,176.

*To all whom it may concern:*

Be it known that I, JAMES BURKE, a citizen of the United States, residing at Erie, in the county of Erie and State of Pennsylvania, have invented certain new and useful Improvements in Dynamo-Electric Machines, of which the following is a full, clear, and exact specification.

My invention relates to dynamo electric machines, and to various features of construction, the object of my invention being in general the construction of machines which will have a high degree of efficiency, be well ventilated throughout, and simple and economical in construction, together with securing machines of great strength in all parts.

One of the important features of the invention relates to the construction and arrangement of the laminæ.

Prior to my invention, it has been customary to build up the laminated portion of circular segments when the size of the machine has been so large as to make it desirable to use the segmental construction instead of using laminæ stamped in one piece. By my invention, the form of the segments instead of being circular on the inner and outer periphery is straight on one side, or substantially so. With this form of laminæ there is a considerable saving in material, as a larger number of laminæ may be stamped from the same amount of material than when using prior forms of construction, as will afterward be explained. Also the segments may be so designed as to use the same die for all segments, and also secure a break joint arrangement in assembly. Furthermore the form is such that by my preferred form of assembly, a greatly increased radiating surface is obtained.

My invention is also applicable to small machines in which the complete lamina is stamped in one piece.

Another feature of my invention relates to the form of the supporting frame and to means for clamping the laminæ together in an axial direction and for locking the laminæ in position.

Another feature of my invention relates to the construction of the field pole with a view to securing ample ventilation of the pole pieces and of the field windings; also a form of construction which may be easily assembled and secure a high degree of mechanical strength.

Other important advantages and objects will be understood by those skilled in the art.

My invention will be understood from the following description and accompanying drawings, in which—

Figure 2:
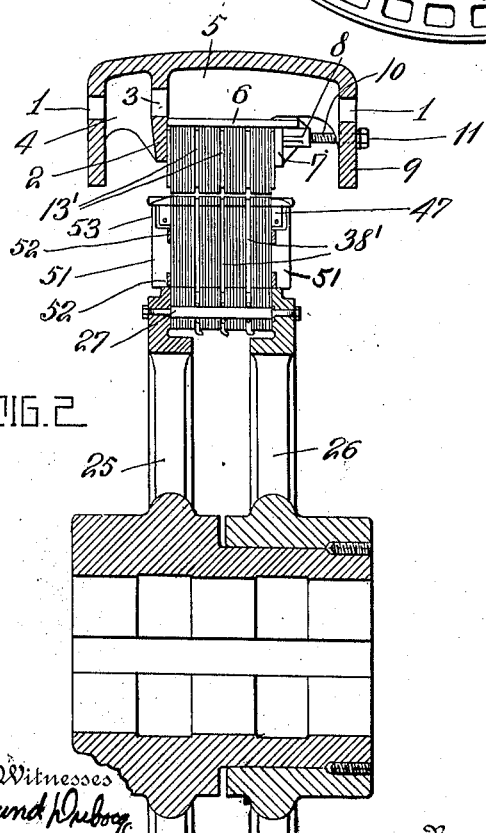
Figure 13:
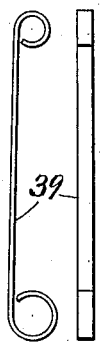
Figure 14:
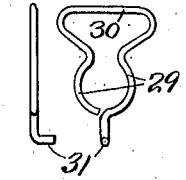

Figure 1 is a side view, partly in section, of one form of machine embodying my invention and with the revolving element removed; Fig. 2 is a sectional view on line 2—2 of Fig. 1 and showing part of the revolving element in section; Fig. 3 is a sectional view of part of the stationary element showing the form of the laminæ, the method of assembling and supporting means; Fig. 4 is a diagram showing the preferred form of blanks for the form of segment shown in Fig. 3 and the preferable arrangement in dividing the strips of sheet metal; Fig. 5 is a side view of the outside clamping pieces for holding the laminæ of the stationary elements in place; Fig. 6 is a plan view of the clamping segments looking from the axis of the machine; Fig. 7 is a side view of a portion of the rotating field element showing another form and arrangement of segments; Fig. 8 is a sectional view on line 8—8 of Fig. 7; Fig. 9 is a side view of one of the field poles with the coils removed; Fig. 10 is a side view of the end plate and coil support; Fig. 11 is a bottom plan view of the same; Fig. 12 is a front view of one of the laminæ of which the field poles are built up; Fig. 13 shows a side and plan view of one of the separators for the field poles; Fig. 14 shows a plan and side view of one of the separators in field frame of the rotating element; Fig. 15 is a sectional view of a modified form of stationary element showing the form and manner of assembling the laminæ; Fig. 16 is a similar view of another modification; and Fig. 17 is a side view with some parts removed of another modification, and showing one feature of my invention applied to a revolving element as distinguished from application to a stationary element.

Referring to the construction of the stationary element of Figs. 1 and 2, the supporting frame is in general U-shaped in section as shown in Fig. 2, and provided with numerous openings 1 for ventilation. Within the frame is formed integrally therewith an intermediate plate 2 extending circumferentially within the frame. This plate serves as one of the side supports for the laminæ as shown in Fig. 2, and is provided with ventilating openings 3 and strengthened by the ribs 4 between this plate and the other side of the frame. Within the main frame is a series of ribs 5 having keys 6 upon which latter the laminæ are built up. Instead of using plates with through clamping bolts or other usual clamping means, I provide a series of clamping plates with adjustable means between them and an outer side of the main frame for forcing the laminæ together, and for holding the clamping plates in their final position. The clamping plates 7 are shown in Figs. 2, 5 and 6 as having strengthening ribs and bosses 8. Between the bosses 8 and the outer side 9 of the main frame are located the bolts 10 having their ends seated against the bosses 8 and having a threaded engagement with the side 9 of the main frame. By turning the bolts 10 the laminæ will be forced together to any desired degree and after the final adjustment is attained and the machine is completed the projecting heads 11 may be cut off flush with the side of the frame. With this form of construction all bolts or other parts passing through the laminæ are avoided, the laminæ may be easily and quickly clamped together without the use of special tools and which is frequently a matter of difficulty with large machines, and the construction also serves as a desirable permanent clamping means and which if necessary will allow the machine to be easily disassembled and reassembled, the devices necessary remaining as a permanent part of the machine. The clamps 7 are provided with tongues 12 adapted to engage grooves in the adjacent clamps which assist in retaining the clamps in their proper position, and to further hold the clamps in place a bolt 13 engages the inner side of the ribs on adjoining clamps, the bolts passing through the keys 6, as shown in Figs. 5 and 6.

On the inner faces of the ribs 5, which faces are finished with a curvature corresponding to that of a circle having the center that of the revolving element, are secured the keys 6 which locate the laminæ. Each key 6 has a projecting face 7' which engages the finished face of the rib, and is fixed in position by screws 8'. Owing to the curvature of the faces of the ribs, the keys may be readily adjusted to their proper angular positions before being fixed in place, as the radial distance of the keys from the center is always the same for each position on the face of the rib. This arrangement of keys for locating the laminæ obviates the necessity of providing accurately finished surfaces on the ribs for receiving the laminæ, and provides a simple and effective means for properly locating and supporting the laminæ.

The form of the laminæ is indicated in Fig. 3 and as having the usual toothed portion. The opposite edge of each lamina however, forms a straight line as distinguished from the usual curved edge. In the form shown in Fig. 3, each lamina extends from one key 6 to the adjacent key, but instead of extending to the center of each key, the end 9' falls considerably short of the middle of the key while the end 10' extends a corresponding distance beyond the middle of the key. Also the lamina is made of greater width at one end by reason of the extension 11' which has a greater width than the corresponding part 12' at the opposite end. With this form of lamina it will be seen that as adjoining laminæ are assembled end to end, a complete ring will be formed embracing the keys 6. In forming the next layer, the laminæ are reversed, and consequently take the position indicated by dotted lines in Fig. 3 resulting in a break joint arrangement as shown, and further resulting in an outer periphery of the assembled laminæ which is grooved throughout by reason of the extensions 11' of one layer extending beyond the parts 12' of the next layer and similarly extensions 11' of the succeeding layer extend beyond the parts 12' of adjoining layers. Instead of reversing each layer several adjoining layers may be assembled in the same way followed by several reversed layers and so on, but with the form of laminæ shown in 3 I prefer to reverse successive layers. It will be seen by this form of construction that a very large radiating surface is formed on the outer surfaces of the assembled laminæ, and by reason of the free circulation of air through the main frame, the ventilation and radiation of heat is greatly improved. The laminæ may be divided into sections which are separated from each other by any desired form of separators 13'.

Another important advantage of my improved form of laminæ, is the economy effected in stamping the laminæ from the sheet metal. In usual constructions, the outer and inner edges are curved in arcs corresponding to the diameters, and in stamping such form, a considerable waste of metal is usually involved, especially in the smaller sizes of machines. With my form of laminæ however, the straight outer edge allows the laminæ to be stamped with a very small amount of waste material; for example, with the form shown in Fig. 3, the general outline is such that with a certain width of sheet iron, there is practically no waste material, as the laminæ may be stamped from sheet metal of the rectangular form indicated in Fig. 4 which illustrates the form of blank required for forming two laminæ each having an extension 11'. This economy is considerable as the waste material is of practically no value. Another advantage of this form of construction is the great strength secured, and without placing heavy strains upon the main outside frame. The keys 6 and laminæ form virtually an arch construction which is self supporting and throughout which the strains are distributed without transmission to the main frame, thus enabling the main frame to be comparatively light.

Another form of laminæ for use in the stationary element is illustrated in Fig. 15. In this case, each lamina 14 has a straight outer edge and extends from one rib or key 6 to the second rib or key and is shown as extending to the middle of the rib at each end. In assembling the next layer, the laminæ will extend between the intermediate set of ribs, and thus secure a break joint arrangement and the broken or grooved outside surfaces giving the large radiating surface as explained in connection with the form of laminæ shown in Fig. 3. The economy in stamping from sheet metal is also effected. The form of laminæ shown in Fig. 15 is well adapted for use in smaller machines than the form shown in Fig. 3.

In Fig. 16 still another form of laminæ adapted for the stationary element is indicated. Each lamina 15 extends from one rib or key to the second rib or key as in Fig. 15, but instead of extending to the middle of each key, the part 17 extends beyond the middle, and the part 18 falls correspondingly short of the middle. This form results in a further breaking of the joints when the laminæ are assembled. For example, the first layer of laminæ may be placed as indicated by the full lines in Fig. 16; the next layer may be placed to engage the intermediate keys with abutting joints on lines 19, then the next layer may engage the same set of keys as the first layer, but with the laminæ reversed forming butt joints on lines 20, and then the next layer may engage the intermediate set of keys with the laminæ reversed and so form the butt joints on lines 21, there thus being four different joints all breaking joints with each other.

In Fig. 17, another form of laminæ is indicated and which is shown adapted for use on a rotating element, the outer periphery of the laminæ forming the teeth for receiving the windings. The frame 22 of the rotating element is shown as having a number of arms, the ends of which are finished and have key-ways formed therein. In this case the laminæ 23 have straight inner edges instead of curved as usual, and each lamina engages two adjoining arms of the frame and have end portions 24, 24 which extend half-way beyond the arms engaged; thus when one layer of laminæ is assembled a complete ring is formed. When the next layer is assembled, the laminæ are shifted circumferentially the distance of one arm which results in a break joint arrangement as shown in Fig. 17. Also the inner surfaces of the assembled laminæ will be deeply recessed and provide very large radiating surfaces, as explained with reference to the form shown in Fig. 3. Likewise there is great economy in reducing the amount of waste material in stamping the laminæ as explained in connection with the prior forms.

Obviously the particular form of laminæ may widely vary in different constructions while securing the advantages of my invention, and the manner of assembling may be varied in different constructions.

Referring now to the rotating element of the machine shown in Figs. 1 and 2, this in the particular form shown is made up of two separable supporting frames 25, 26, the latter being movable axially over the hub of the former and clamping a segmental rim between them, the parts being held together by through bolts 27. The form of laminae of which the rim is composed is shown in Fig. 7, each lamina 28 being formed in general in the manner already described with the straight edges on one side and so assembled over the bolts 27 as to break joints and provide the large inner radiating surfaces. The laminæ are subdivided in sections as shown in Fig. 2 spaced by any desirable form of separator. A simple form of separator well adapted for this construction is that shown in Fig. 14. The same is formed of iron wire and is bent so as to closely engage the bolts 27 by the part 29, is extended at its upper portion to assist in separating the projections of the laminæ by the part 30 and is provided with an extension 31 which extends below and engages the inner surfaces of the laminæ. The bolts hold the separators from displacement, and the extension 31 prevents the separators from turning out of their proper position around the bolts. The outer periphery of this laminated portion is provided with dovetailed grooves which receive the dovetail extensions from the pole pieces. The pole pieces are laminated and the form of the laminæ is indicated in Fig. 12. The laminæ have extensions 32 forming the pole tips and is slotted at 33 through the main portion of the stamping except a comparatively short length at the outer end of the pole. At the inner end of the laminæ is formed an opening 34 adapted to receive pins 35. Also at the inner end of the laminæ is formed the dovetail 36 of a size adapted to fit in the dovetail grooves in the periphery of the laminated rim. At 37 are formed holes through the laminæ for receiving bolts 38 which hold the parts together. The assembled pole piece may be easily placed in the dovetail grooves of the laminated rim by reason of the fact that the dovetail 36 neatly fits into the dovetail groove and by reason of the sides of the pole piece being slightly yieldable toward each other on account of the slot 33. After being placed in position, the pins 35 are inserted in the holes 34 and merely serve to keep the divided parts of the pole piece separated and so prevent the pole piece working loose.

In building up the pole pieces, the laminæ are divided into sections as shown in Figs. 2 and 8, the openings 38' between sections corresponding in position to the openings in the laminated rim for ventilation. The spacing means used in the pole pieces is of such form as to secure a maximum amount of clear space for the passage of air. For this purpose I use a wrought iron strip 39 of the form shown in Fig. 13, the end having the turn of larger diameter serving to engage and surround the pin 35 and the end having the turn of smaller diameter surrounding and engaging the outer pin 35' which passes through the pole piece. This strip 39 therefore extends the length of the pole piece at the middle and presents very slight obstruction to the passage of air. On the two inner bolts 38 and the two intermediate bolts 38, may be placed spacing washers for assisting in the separation of the laminated section. I also provide further means to separate the sections at the pole tips by bending over the tips 40 of the laminæ adjacent into the ventilating openings as shown in Figs. 8 and 9. By this means of spacing the sections of the pole pieces very little of the air space is occupied by the spacing means, and the construction is at the same time simple and substantial.

The tips 32 of the pole piece serve to retain the field winding 41 in position at the sides of the pole pieces, and in order to support the end turns of the field coils from outward movement and to provide further means for ventilation, I provide end plates of novel construction, and also provide novel means for adapting these plates to withstand the great strain upon them. The form of these end plates is shown in Figs. 9, 10 and 11. Each of these metal plates comprise a portion 42 extending across the end of the pole piece and pole tips and having slotted portions 43 to assist in the ventilation. The plate further consists of an outwardly extending part 44 which extends over the end turns of the field coils, and serves as their outer support. Through this extension 44 is an opening 45 through which passes the outer rivet bolt or pin 35'. In the plate 44 are also formed radial openings 46 which provide further means for ventilation. On the inner face of plate 44, and near the pole piece is formed an extension 47 having a slot 48, and the slots 48 in the opposite end plates of a pole piece receive a tie plate 49 which passes through the slot 33 formed in the laminæ, and is connected to the extensions 47 of the end plates by pins 50. This construction not only occupies small space, but is one well adapted to withstand the great strains due to centrifugal force, the strains being taken up by the tie plate 49. The construction also provides for ventilation of the field coils. The field coil 41 as shown in Fig. 8 is of such form that at the ends it extends beyond the projections 47 and seats under the outer portions of the plates 44. Also between the outer laminæ of the pole piece, I provide a distance piece 51 as shown in Figs. 2, 8 and 9. This consists of a narrow radial strip 51 and cross pieces 52 which engage the end faces of the pole pieces. The strip 51 has an outer extension 53 extending out over the extensions 47 to keep the coil from directly engaging the extensions 47. These spacing pieces are preferably made of hard wood or other suitable material. It will thus be seen that the end turns of the field coils having comparatively large ventilating openings between the ends of the pole pieces and the end turns of the coil. The air can readily pass within the ends of the coil at the base from outside of the machine, and after passing up through the spaces on opposite sides of the strip 51, it may then pass out through the openings 46 and 43 in the end plates.

Although I have described certain specific forms of my invention, it will be understood that various other modifications in construction may be made without departing from the spirit or scope of my invention.

Having thus described my invention, I declare that what I claim as new and desire to secure by Letters Patent, is:

1. In a dynamo electric machine, the combination of an exterior frame having inwardly projecting ribs, keys held by said ribs, laminæ held in fixed relation to said ribs by said keys, certain of said laminæ projecting radially beyond others, the edge of each lamina extending between the ribs being of a length less than the span of the ribs between which the laminæ are disposed to thereby provide lateral spaces between the laminæ and the ribs.

2. In a dynamo electric machine, the combination of an exterior frame provided with ventilating openings and having transversely disposed, inwardly projecting ribs, keys held by said ribs, laminæ having straight edges extending between the ribs, said laminæ being held by said keys in fixed relation to said ribs, said straight edges of the laminæ being of a length less than the distance between the ribs between which the laminæ are disposed to thereby provide lateral recesses between the ribs and the laminæ.

3. In a dynamo electric machine, the combination of an exterior frame having transversely disposed, inwardly projecting ribs, and laminæ assembled in groups extending between certain ribs and held in fixed relation to the ribs, the length of the outer edges of said laminæ being less than the span between the ribs between which the laminæ extend to provide ventilating spaces between the groups of laminæ and the ribs.

4. In a dynamo electric machine, the combination of a frame provided with ventilating openings and having transversely disposed, projecting ribs, keys secured to said ribs, laminæ arranged in superposed layers disposed between certain ribs and held by said keys in fixed relation to said frame, the edges of said laminæ extending between the ribs being less than the span between the ribs between which the laminæ are disposed to thereby provide lateral spaces between the laminæ and the ribs.

5. In a dynamo electric machine, the combination of a frame having transversely disposed projecting ribs, said ribs being finished on the arc of a circle, keys engaging the finished circular faces of said ribs, laminæ assembled in groups disposed between certain of said ribs, said laminæ being held by said keys in fixed relation to the ribs, the edges of said laminæ extending between the ribs being less than the span between the ribs between which the laminæ are disposed, end plates engaging said laminæ, and means between said end plates and said frame for retaining said laminæ in position.

6. In a dynamo electric machine, the combination of a frame having a retaining plate intermediate its rims, ribs disposed on the inside of said frame and transverse to said retaining plate, said retaining plate and said rims having ventilating openings, and laminæ arranged in layers forming the core, said layers of laminæ lying in planes transverse to the length of said ribs, said layers being arranged with respect to each other to provide ventilating circumferential recesses.

7. In a dynamo electric machine, the combination of a frame having transversely disposed projecting ribs, said ribs being finished on the arc of a circle, keys engaging the finished circular faces of said ribs, laminæ disposed between certain of said ribs, the edges of the laminæ extending between the ribs being less than the span between the ribs between which the laminæ are disposed to thereby provide lateral recesses between the laminæ and the ribs, and said laminæ further having laterally projecting portions.

8. In a dynamo electric machine, the combination of a frame having projecting ribs, said ribs being finished on the arc of a circle, keys fixed to the finished faces of said ribs, said keys extending beyond the sides of said ribs, laminæ held by said keys and positioned between certain ribs, the edges of said laminæ extending between the ribs being of a length less than the span between the ribs between which the laminæ are positioned to provide spaces between the ribs and the laminæ.

9. In a dynamo electric machine, the combination of a channeled frame, laminæ disposed in the channel of said frame and supported on one side against a side of said channeled frame, and adjustable means tending to spread the sides of said frame apart for holding said laminæ in position, said means comprising an end plate positioned at the side of said laminæ opposite said one side and an adjustable element held by said frame and abutting against said end plate.

10. In a dynamo electric machine, the combination of a frame, laminæ supported by the frame, and interlocking end plates overlapping the joints of said laminæ for retaining said laminæ in position.

11. In a dynamo electric machine, the combination of a frame, laminæ supported by the frame, interlocking end plates for retaining said laminæ in position, and means between said end plates and the side of the main frame for holding said end plates from axial movement.

12. In a dynamo electric machine, the combination of a channeled frame, laminæ disposed in said channel and supported on one side against a side of said frame, and means tending to spread the sides of said frame apart for holding said laminæ in position, said means comprising an end plate engaging said laminæ on a side opposite to said one side and a bolt abutting against said end plate and in screw-thread engagement with the other side of said frame.

13. In a field pole for a dynamo electric machine, the combination with the pole piece and field winding, of end plates extending over the outer end of said winding, said plates having inwardly extending projections lying in a plane which contains the axis of the machine, and means passing through the pole piece connecting said projections.

14. In a dynamo electric machine, the combination of the pole piece, a field winding, end plates extending over the outer end of said winding, each of said end plates having radially extending parallel plates, and a tie-plate passing through the pole piece and between said radially extending plates of each end plate.

15. In a dynamo electric machine, the combination of a pole piece, a winding thereon, end plates extending over the outer end of said winding, said end plates having ventilating openings, and means for spacing the end turns of said winding from the ends of the pole piece for providing ventilating spaces within the end turns.

16. In a dynamo electric machine, the combination of a polar projection, a winding thereon having a ventilating space between the end turns of the winding and the ends of said polar projection, end plates extending over the outer ends of the winding and having projections extending within said space, said projections lying in a plane containing the axis of the machine, and a connecting means passing through the pole piece connecting said projections.

17. In a dynamo electric machine, the combination of a laminated polar projection having the laminæ divided in sections, bolts passing through the polar projection, and a spacing strip between said sections extending the length of the polar projections substantially and the said strip encircling certain of said bolts at its ends.

18. In a dynamo electric machine, the combination of a frame, laminæ supported by said frame, means passing through the laminæ for holding the laminæ together, and means for separating the laminæ comprising an iron wire engaging said first named means and bent over the outside of the laminæ.

19. In a dynamo electric machine, a laminated polar projection having extended tips, said laminæ being divided into sections and having an air space between them, the laminæ adjoining said air spaces being bent over at the tips for spacing the sections, bars passing through said laminæ, and spacing means around said bars.

20. In a dynamo electric machine, a frame, pole pieces having their inner ends embedded in said frame, the said pole pieces being laminated and slotted lengthwise, means inserted between the divided parts of the pole piece for spacing said parts, and means extending through said slots for supporting the field coils.

21. In a dynamo electric machine, the combination of a channeled frame having an integral retaining plate disposed within the channel, ribs projecting from said frame lying transverse to the channel thereof, laminæ supported by said frame engaging said plate and disposed adjacent said ribs, an end plate for the laminæ, and adjustable means between the end plate and the inside of the main frame for retaining the end plate in position.

22. In a dynamo electric machine, the combination of a frame having projecting ribs, keys held by said ribs, laminæ of the same size and shape held by said keys in fixed relation to said ribs and disposed between certain of said ribs, the edges of said laminæ extending between the ribs being less than the span between the ribs between which the laminæ are disposed.

23. In a dynamo electric machine, the combination of a channeled frame having an integral retaining plate disposed within the channel, said plate having air passages communicating with air passages in the rims of said channeled frame, laminæ supported against said retaining plate on the inside thereof, said laminæ being spaced from the inner side of said frame, end plates disposed on the side of said laminæ opposite said retaining plate, and bolts for adjusting the pressure exerted between said end plates and the side of said channeled frame.

24. In a dynamo electric machine, the combination of a channeled frame having an integral retaining plate disposed within the channel, ribs projecting from said frame and lying transverse to the channel thereof, keys on said ribs, laminæ supported by said keys and held by the same spaced from said ribs, said laminæ being of the same size and shape and arranged in layers which are staggered in relation to each other so as to provide breaking joints and circumferential recesses, and adjustable means for adjusting the pressure exerted between said laminæ and the side of said channeled frame.

25. In a dynamo electric machine, the combination of a frame having projecting ribs, keys held by said ribs, laminæ of the same size and shape held by said keys in fixed relation to said ribs and disposed between certain of said ribs, the edges of said laminæ extending between the ribs being less than the span between the ribs between which the laminæ are disposed, said laminæ being shifted relatively to one another to provide radially projecting portions.

In testimony whereof I affix my signature, in presence of two witnesses.

JAMES BURKE.

Witnesses:
L. K. SAGER,
GEO. A. HOFFMAN.